United States Patent [19]

Sedano et al.

[11] Patent Number: 5,778,025
[45] Date of Patent: Jul. 7, 1998

[54] TRANSMITTING-RECEIVING CIRCUIT

[75] Inventors: Jose Luis Peña Sedano; Jesus Peña Melian, both of Madrid, Spain

[73] Assignee: Telefonica De España, S.A., Madrid, Spain

[21] Appl. No.: 396,258

[22] Filed: Mar. 1, 1995

[30] Foreign Application Priority Data

Mar. 7, 1994 [ES] Spain .................. 94 00462

[51] Int. Cl.$^6$ .................................. H04B 1/38
[52] U.S. Cl. .......................... 375/219; 375/242
[58] Field of Search ........................ 375/219, 242

[56] References Cited

U.S. PATENT DOCUMENTS

| 4,047,201 | 9/1977 | Kerllenevich | 364/200 |
| 4,680,431 | 7/1987 | Flach | 178/69 R |
| 4,933,561 | 6/1990 | Goransson et al. | 250/551 |
| 5,399,926 | 3/1995 | Adams et al. | 375/219 |
| 5,490,171 | 2/1996 | Epley et al. | 375/219 |

*Primary Examiner*—Melvin Marcelo
*Attorney, Agent, or Firm*—Reid & Priest LLP

[57] ABSTRACT

A transmitting receiving circuit having two different blocks, one for transmitting, and one for receiving, the transmitting block relying on an inverter and a differential transmitter, while the receiving block has a differential receiver, four optocouplers, two inverters, a voltage regulator and two resistors, the galvanic discoupling being carried out between the parts corresponding to the transmission and reception by telefeeding the differential receiver from the board where the signal is transmitted, the optocouplers separating the receiving block parts fed from the board where the transmitting-receiving circuit is installed, from the parts fed from the module transmitting the signal, the output thereof being optically disconnected from the distant end.

6 Claims, 1 Drawing Sheet

TRANSMITTING-RECEIVING CIRCUIT

BACKGROUND OF THE INVENTION

The present specification relates to a Patent of Invention referring to a transmitting-receiving circuit, the purpose of which is to be used in modernized electromechanical telephone stations, making a communication possible among different modules of the interconnecting network to be installed in said modernized electromechanical telephone stations.

1. Field of the Invention

This inventions applies to the telecommunication field, and in a more definite way, to electromechanical stations utilized for public telephony.

2. Related Art

Within the modernization scheme of electromechanical stations, the incorporation of electronic recorders into said stations is imposed.

In the framework of said modernization scheme, the structure of the system implies a communication among different modules incorporated into the electromechanical station, which can be—distant each other, and called Modules of Interconnecting Network (MRI) and Modules within a Group (FNS), to be operated with 2 Mbits/s signals, by using a braided couple as a means of transmission.

There are several systems which can be taken as related art, solving these problems, all them revealing the fact that they are fitted with several circuits located on several plates or boards, such as the boxes marketed to be used for connecting PC's by using the standard RS-232-C, where, in a partial way, the features of a transmitting-receiving circuit are reflected, but, nevertheless, owing to their size and functional character, their utilization as a hybrid component is not feasible.

An evident solution to this problem would be to rely on a transmitting-receiving circuit which could be appropiate to substantially small spaces, so that it can be used as a more integrated component in a circuitry board.

Nevertheless, nothing is known up-to-date about the existence of a circuit provided with the above-mentioned characteristics considered as suitable.

SUMMARY OF THE INVENTION

The transmitting-receiving circuit of the invention constitutes per se an evident novelty in the field into which it is incorporated, since starting from it, it is possible to make use of an element meeting all the necessary characteristics for attaining the pursued aim.

In a more definite way, the transmitting-receiving circuit of the invention includes of a hybrid circuit composed of two transmitting chips and two receiving chips RS-422-A CMOS (quadruple), four optocouplers, two voltage regulating chips, two inverter chips, and several discoupling condensers, relying on the polarization resistors necessary for a correct operation.

In relation to blocks, it is to be pointed out that the circuit is formed by a transmission side and a reception side, which form two PCM (Pulse Code Modulation) and/or statistical links, these two blocks being duplicate in order to service four links as a minimun.

The transmitting block is formed starting from an inverter and a differential transmitter for each of the links.

The receiving block is formed starting from a differential receiver, an optocoupler, two inverters, a voltage regulator, and two resistors for each link The circuit separates physically the modules it communicates, so avoiding problems of mass boucles.

The galvanic discoupling between the parts corresponding to the transmission side and the reception side is due to the fact that the feeding to the differential receiver is made from the module transmitting the signal, this signal passing, then, through the optocoupler.

This optocoupling device separates the parts of the receiving block fed from the module where the transmitting-receiving circuit is located from the parts fed from the module transmitting the signal.

Thus, the transmitting-receiving circuit transmits each discoupled signal between origin and destination, by feeding the receivers from the transmission point.

Though the circuit processes equally the PCM type and the Statistical links, these links are located so that a transmitter chip, a receiver chip and an inverter chip form a PCM link and a statistical link, both being bound to the same link.

So, a failure of any chip will cause a fall of only one link, not affecting other link.

The optocouplers used are not conductive when there is no information in the link, the transmitting and receiving process being made by means of a successive series of signal reversings, minimizing the consumption of the distant feeding.

The signal is reversed before being delivered to the transmitters, forcing to an additional reversing at the reception, in order to diminish the consumption, specially of the statistical links, which are at a high level when at rest, which would force the optocoupler to be conductive.

For a correct operation of the transmitting-receiving circuit, a terminal resistor between the positive and negative inputs of the receivers is to be located, but owing to the fact that the value of the resistor should approximately be equal to the value or the characteristic impedance of the cable used, said resistor not being included in the circuit, but located out of same, so avoiding consequently to fix the type of cable used on the links.

The utilization of Standard RS-422 on the links is due to the high immunity presented against the noises commonly appearing, and the distance at which it is possible to transmit, the links offering, so, a high reliability before the noises induced by the relays and other elements of the electromechanical stations.

BRIEF DESCRIPTION OF THE DRAWINGS

In order to complement this description and to aid to a better understanding of the features of the invention, the accompanying drawing sheet, which is a part of this specification, shows in an illustrative but non limitative sense the following:

The sole figure shows a block diagram of the transmitting-receiving circuit of the invention, representing the signals and fundamental components of the circuit concerned.

DETAILED DESCRIPTION OF THE PREFERRED EMBODIMENT

Figure 1:
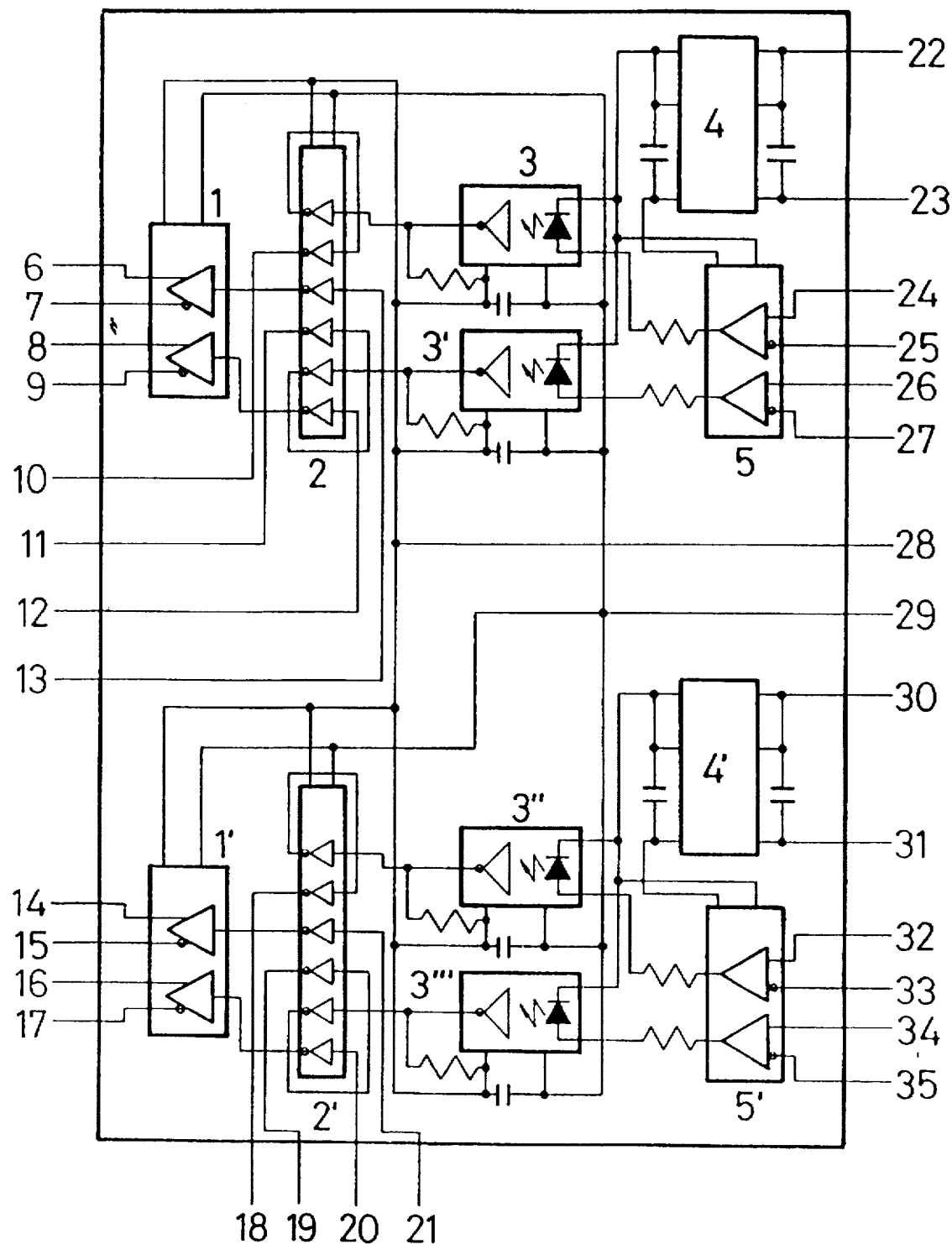

From the only FIGURE, it can be seen how the transmitting—receiving circuit of the invention is constituted starting from two similar large blocks, each of which having a double transmitting-receiving functional character, where the separation between the transmitter of one circuit and the receptor of the other circuit is effected by using two optocouplers.

Following the diagram of the single figure, it can be noted how the invention is configured by two receivers (5) and (5'); two voltage regulators (4) and (4'), and four optocouplers (3), (3'), (31") and (3'").

At the output of the optocouplers, the signals arrive at the transmitters (1) and (1') through the inverter blocks (2) and (2').

The outputs of the signals transmitted are referenced (6), (8), (14) and (16), while the output of the refused differential signals transmitted are referenced (7), (9), (15) and (17).

The signals to be received are referenced (24), (26), (32) and (34), the refused differential inputs of the signal to be received corresponding to the references (25), (27), (33) and (35).

References (22) and (30) correspond to the telefed GND (mass), and references (23) and (31) correspond to Vdc (voltage, direct current) telefed of the voltage regulators.

There are also indicated the local Vdc (28) and the local GND (29).

The outputs of the signal received are referenced (10), (11), (18) and (19), and the inputs of the signals to be transmitted are referenced (12), (13), (20) and (21).

In order to minimize the consumption of the receivers (5) and (5') not used, non reverted inputs of the receivers are fixed to Vdc, and reverter inputs to GND, it being understood that this mass and feed are not those of the hybrid circuit, but the mass and feed obtained from the voltage regulators (4) and (4').

Said regulators (4) and (4') can break if too much power is to be removed, for which reason they are chosen so that they are able to withstand the worst conditions under which they can be subjected.

The optocoupling blocks (3) each include an optocoupler and a ceramic condenser connected, as close as possible, to the feeding pins and mass of said element.

The output of the receiver attacks the optocoupler through a resistor limiting the current to an adequate value, without increasing too much the current required for the feeding voltage.

The optocoupler output is reversed one time for adapting the signal to its output, and one time for cancelling the initial reversing made to the signal to be transmitted in order to reduce the consumption.

It is not considered necessary to extend more this description for an expert in the art to understand the scope of the invention and the advantages derived from it.

The materials, shape, size and arrangement of the components are open to variation, provided that it does not imply any alteration to the essence of the invention.

The terms under which this specification has been described should be always taken in an ample and non limitative sense.

We claim:
1. A transmitting-receiving circuit, comprising:
   a) a transmitting block including:
      1) an inverter block including plural inverters; and
      2) two differential transmitters, responsive to a first subset of the plural inverters in the inverter block, and providing respective transmitted signals; and
   b) a receiving block that is galvanically discoupled from the transmitting block, the receiving block including:
      1) two differential receivers for receiving respective received signals;
      2) two optocouplers, respectively responsive to the two differential receivers, and to which a second subset of the plural inverters in the transmitting block are responsive;
      3) two resistors, disposed between respective pairs of the differential receivers and the optocouplers; and
      4) a voltage regulator for providing to the differential receivers, a voltage and ground that are discoupled from the transmitting block.

2. The circuit of claim 1, wherein:
   the circuit is installed on a board; and
   the optocouplers optically discouple parts of the receiving block on the board from parts of the transmitting block.

3. A transmitting-receiving circuit comprising:
   a) a transmitting block including:
      1) an inverter block including plural inverters; and
      2) two differential transmitters, responsive to a first subset of the plural inverters in the inverter block, and providing respective transmitted signals; and
   b) a receiving block that is galvanically discoupled from the transmitting block, the receiving block including:
      1) two differential receivers for receiving respective received signals;
      2) two optocouplers, respectively responsive to the two differential receivers, and to which a second subset of the plural inverters in the transmitting block are responsive;
      3) two resistors, disposed between respective pairs of the differential receivers and the optocouplers; and
      4) a voltage regulator for providing to the differential receivers
   a voltage and ground that are discoupled from the transmitting block; wherein:
      A) the circuit is installed on a board;
      B) the optocouplers optically discouple parts of the receiving block on the board from parts of the transmitting block;
      C) the optocouplers are not conductive when there is no information in a statistical link; and
      D) a transmitting process and a receiving process include a successive series of signal inversions.

4. A transmitting-receiving circuit, comprising:
   a) a transmitting block, powered by a local voltage and a local ground, the transmitting block including:
      1) an inverter block having:
         i) first inverter inputs with corresponding first inverter outputs; and
         ii) second inverter inputs with corresponding second inverter outputs;
      2) two differential transmitters, responsive to respective second inverter outputs and providing respective transmitted signals; and
      3) two pull-up resistors, each of the pull-up resistors having a first terminal connected to the local voltage; and
   b) a receiving block that is galvanically discoupled from the transmitting block, the receiving block including:
      1) two differential receivers for inputting respective received signals;
      2) two optocouplers, responsive to respective differential receivers and providing respective optocoupler output signals to respective first inverter inputs via respective optocoupler outputs that are connected to second terminals of respective ones of the pull-up resistors so as to shape the optocoupler output signals;
      3) two current-limiting resistors, disposed between respective pairs of the differential receivers and the optocopulers, for limiting current between the differential receivers and the optocouplers; and 4) a voltage regulator, responsive to a remotely-fed voltage and a remotely-fed ground for providing a second voltage and second ground to the differential receivers that are discoupled from the local voltage and the local ground.

5. The circuit of claim 4, wherein:

the circuit is installed on a board; and the optocouplers optically discouple parts of the receiving block on the board from parts of the transmitting block.

6. The circuit of claim 5, wherein:

the optocouplers are not conductive when there is no information in a statistical link; and a transmitting process and a receiving process include a successive series of signal inversions.

* * * * *